Jan. 2, 1951 — H. K. REHN — 2,536,570
ADJUSTABLE LUGGAGE CARRIER
Filed Feb. 21, 1949
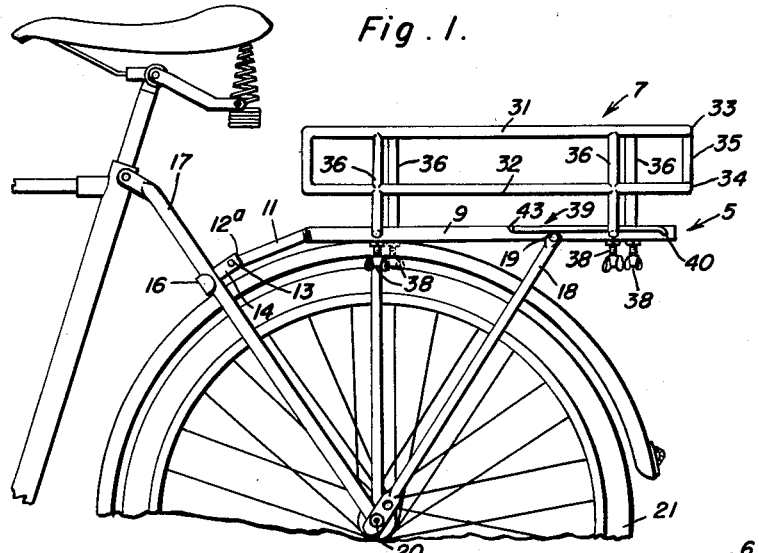
Fig. 1.
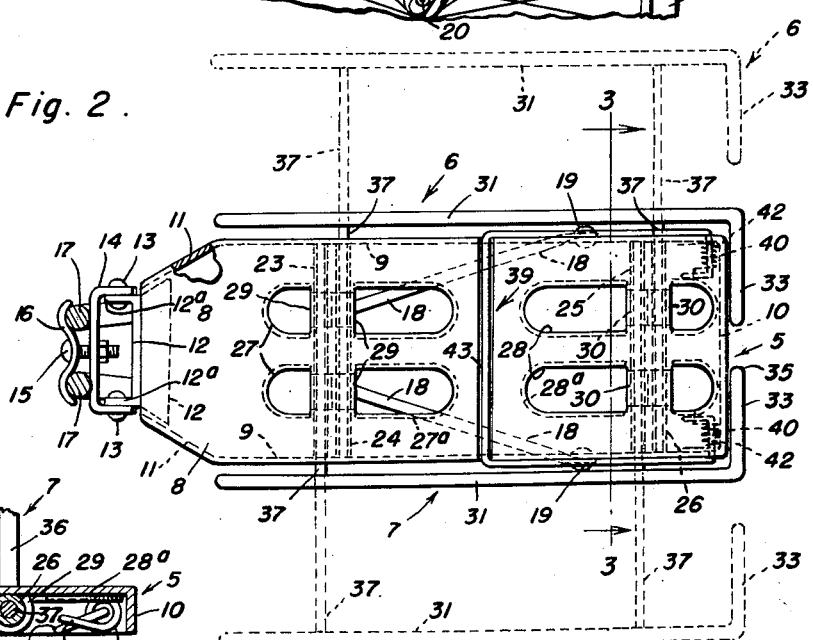
Fig. 2.
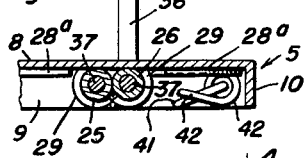
Fig. 4.
Fig. 3.
Inventor
Herman K. Rehn
By Clarence A. O'Brien
and Harvey B. Jacobson
Attorneys Patented Jan. 2, 1951

2,536,570

UNITED STATES PATENT OFFICE 2,536,570

ADJUSTABLE LUGGAGE CARRIER

Herman K. Rehn, Amherst, Mass.

Application February 21, 1949, Serial No. 77,638

3 Claims. (Cl. 224—32)

The present invention relates to certain new and useful improvements in luggage clamping and carrying racks which are classified in the category which are commonly used on and in connection with a bicycle and where the carrying distance is, let us say, neighborhood range and the load handled is neither too heavy nor too unwieldy for the rider to come with.

Luggage carrying racks in the field of invention here under advisement are of many and varied forms but are generally of openwork construction and resemble a basket or the like. Needless to say, I am conversant with the prior state of the art to the extent that I realize that luggage racks have been devised by others for use on the front of a bicycle in conjunction with the handle bars and also on the rear of the bicycle frame for use in conjunction with the customary wheel guard and rear wheel fork or associated post. My invention falls in the latter category and, in carrying out the principles of the same, I have evolved and produced a structurally distinct rack which, in addition to being readily adjustable for carrying packages of different sizes, is unique and aptly constructed for carrying small luggage. wooden, cardboard, and equivalent containers fully loaded with miscellaneous articles.

In reducing to practice a preferred embodiment of the invention I provide a substantially horizontal stamped metal base, adaptable means for shackling the forward end of same on the rear wheel fork, means for propping and supporting the main portion of said frame from the rear wheel axle, said frame having extensible and retractible openwork sides or fences which are rigid but adjustable to satisfactorily hold article filled boxes and packages of varying sizes and kinds, said sides serving not only as box embracing but retaining clamps as well.

More specifically, the stated load supporting base provides a frame and embodies pairs of fore and aft transverse braces which are open ended and which function as tubular adapters for horizontally extensible and retractible guides carried by fence-like sides and also includes a plate which latter has struck out tongues bent around and thus fastened to said adapters, whereby to provide a sturdy and reliable foundation for the stated load.

Novelty is also predicated on a simple sheet metal unit or stamping first cut to size with all required openings stamped in one operation and with its principal marginal edges bent down to provide stabilizing flanges functioning as a suitable rim.

Other objects and advantages will become more readily apparent from the following description and the accompanying illustrative drawings.

In the drawings, wherein like numerals are employed to designate like parts throughout the views:

Figure 1 is an elevational view showing a fragmentary portion of a conventional-type bicycle and also showing my improved luggage carrying and transporting rack and the manner in which it is constructed and used;

Figure 2 is a top plan view, on an enlarged scale, of the stated rack and showing dotted line positions of the adjustable sides or fences;

Figure 3 is a cross-section on the line 3—3 of Figure 2, looking in the direction of the arrows, and Figure 4 is a fragmentary section on the line 4—4 of Figure 3.

The improved luggage rack or carrier is made up of three essential units; a relatively stationary base or frame unit 5 and a pair of complemental and opposed fences or side units 6 and 7.

Unit 5 comprises a single sheet metal plate 8, generally rectangular, embodying spaced parallel side flanges 9 connected at their right hand ends by a transverse end flange 10 and having their forward ends converging, as at 11, and spaced apart. A smaller but heavier wedge-shaped plate or cleat 12 is situated in the stated space between flange 11 and suitably secured to the forward underside of said base plate 8 and is provided with lugs 12a hingedly connected, at 13, with the ends of a U-shaped bracket 14. The bracket 14 is secured by way of a bolt 15 and properly bent clip 16 to the depending bar members 17 of the rear wheel fork of the bicycle frame (Figure 2).

The numerals 18 designate depending and converging braces or stays which are attached, at 19, to the rim flanges 9 and have their lower ends suitably constructed and fastened on bolt means 20 carried by the hub portion of the bicycle wheel 21 (Figure 1).

The side flanges 9 are rigidly joined together by transverse longitudinally spaced front and rear tubular cross-members or braces, the latter arranged in pairs and those in the front pair being denoted by the numerals 23 and 24 and those in the rear pair by the numerals 25 and 26.

The forward end portion of the plate 8 is narrowed and fashioned to conform to the converging rim portions 11 and it is in the space between said flanges 11 that the aforementioned cleat 12 is welded or otherwise fastened. Thus, the plate 8 may be reliably clamped to the fork members 17, as shown in Figure 2. The forward and rear portions of the plate 8 have forward and rearward slots formed therein as at 27 and 28 (see Figure 2). The metal portions struck out from these slots provide marginal reinforcing flanges 27a and 28a and, in addition, provide tongues and the tongues are bent or curled and thus embrace and are secured to the aforementioned tubular members 23, 24, 25 and 26. The bent tongues which from said slots 27 form grips and are denoted by the numerals 29 and those which are struck from and fashioned into grips from the rear slots 28 are denoted by the numeral 30. Thus, we have the base plate 8 clipped in position by way of the stated bent tongues 29 and 30 secured to the tubular members 23 to 26, inclusive. It will be noted that the side flanges 9 on both sides have apertures which are lined up with the open ends of said tubular members 23 to 26.

The side units 6 and 7, which constitute the fences, are of duplicate construction and are adjustably mounted and movable toward and from each other by way of the stated base or framework and tubular adapters forming important complemental portions of said base. Each side fence is the same in construction and it is felt that a description of one will suffice for both. Each side member may be visualized as embodying upper and lower L-shaped members 13 and 32 whose long limbs are in superposed parallelism and are parallel to the base and whose short limbs 33 and 34 (see Figure 3) are connected together at 35 to provide rear end guards. The L-shaped members 31 and 32 are connected by vertical struts 36 which have laterally directed lower end portions 37 forming fence mounting guides. These guides telescope into the aforementioned tubular adapters 23 to 26 and the adapters, as shown in Figure 3, are provided with properly situated set screws 38 making it possible to bind and clamp the opposed fences 6 and 7 in set or established positions. It follows, therefore, that the numerals 6 and 7 identify openwork fences which are substantially L-shaped in top plan view and which have projectible and retractible guides 37 slidably operable and fastenable in tubular adapters 23 to 26 forming component parts of a base frame structure. It is also clear that these fences provide effective grips for securing cardboard boxes or the like (not shown) on the base. In fact, they prevent the box from slipping rearwardly from the base and when tightened sufficiently there is little likelihood of accidental displacement of the box or other package.

The numeral 39 designates a U-shaped wire bail whose arm portions have laterally inbent ends 40 which are rockably mounted in bearings provided therefor and which have terminals 41 (see Figure 4) to accommodate return springs 42. This forms a paper or letter clip and the base is indented as at 43 to accommodate the bight portion of the clip.

Novelty is predicated upon a frame structure forming a novel base or platform unit which is propped up over and supported above the rear wheel of a bicycle and which has its forward portion securely shackled on a stock part of the bicycle frame. Thus, the platform is readily applicable, removable and repairable and could, by itself, be used for supporting packages. It has been found more successful, however, to use substantially L-shaped opposed openwork fences to surround the opposite side and rear end portions and to adjustably mount these fences on the base unit. More specifically, the base unit has cross braces which are tubular and which not only brace the frame structure but serve as adapters for guide rods forming complemental parts of the stated package embracing and holding fences.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. An adjustable luggage carried for use on a bicycle comprising an elongated rigid frame, shackling means for attaching one end of said frame to a relatively stationary part of a bicycle frame structure, a plurality of transverse longitudinally spaced cross-braces, said cross-braces being tubular in form and constituting socket members, the latter being adapted to accommodate extensible and retractable rod members, a pair of fence units, each fence unit embodying horizontal L-shaped members and interconnecting vertical struts, the long limbs of said L-shaped members forming main side guards for said frame and the short limbs providing coacting rear end guards for the end portions of said frame, and horizontal rod members rigidly attached to and extending at right angles from the lower ends of said struts and telescopically fitted into their respective coacting socket members, the long limbs of the respective fences being commensurate in lengths with the length of the major portion of said frame.

2. A luggage carrier attachment for the rear end portion of a bicycle comprising a horizontal base having a gradually narrowed downbent forward end portion provided with means for adjustably and detachably connecting same with the usual rear fork of a bicycle, and having transverse longitudinally spaced tubular socket members, a pair of permanently vertical oppositely parallel luggage embracing and clamping fences rising above the upper surface of said base and embodying longitudinal portions substantially as long as the major portion of said base, said fences each being of one-piece construction and having laterally inturned companion rear end portions cooperable with the rear end portion of said base and having, in addition, horizontal right angularly disposed rigid rod members telescoping slidably into respectively corresponding socket members, the downbent forward end of said base projecting forwardly beyond the forward ends of said fences, and manually regulable means for setting and temporarily fixing said fences in various established positions.

3. As a new article of manufacture, a luggage embracing and clamping fence for use on a relatively stationary carrier base comprising a one-piece openwork fence embodying a pair of horizontal upper and lower L-shaped members having long and short limbs, the forward ends of said long limbs being rigidly joined to one another, the rearward ends of said short limbs being rigidly joined to one another, vertically disposed struts rigidly connected with intermediate portions of said long limbs and having lower end portions bent at right angles on planes below the lower long limb, said lower end portions constituting fence attaching and adjusting rods.

HERMAN K. REHN.

REFERENCES CITED

The following references are of record in the file of this patent:

FOREIGN PATENTS

| Number | Country | Date |
|---|---|---|
| 102,739 | Sweden | Oct. 7, 1941 |
| 111,260 | Switzerland | Oct. 21, 1924 |
| 417,060 | Great Britain | Sept. 27, 1934 |
| 504,906 | Great Britain | May 2, 1939 |
| 573,607 | Great Britain | Nov. 28, 1945 |
| 650,122 | Germany | Sept. 11, 1937 |